United States Patent
Scott (10) Patent No.: US 11,303,911 B1
(45) Date of Patent: Apr. 12, 2022

(54) SYSTEMS AND METHODS FOR STORING VIDEO DATA IN MEMORY

(71) Applicant: Xilinx, Inc., San Jose, CA (US)

(72) Inventor: Michael Scott, Menlo Park, CA (US)

(73) Assignee: Xilinx, Inc., San Jose, CA (US)

(*) Notice: Subject to any disclaimer, the term of this patent is extended or adjusted under 35 U.S.C. 154(b) by 0 days.

(21) Appl. No.: 16/749,416

(22) Filed: Jan. 22, 2020

Related U.S. Application Data (60) Provisional application No. 62/795,408, filed on Jan. 22, 2019.

(51) Int. Cl.
| | |
|---|---|
| *H04N 19/184* | (2014.01) |
| *H04N 19/129* | (2014.01) |
| *H04N 19/423* | (2014.01) |
| *H04N 19/64* | (2014.01) |
| *H04N 19/182* | (2014.01) |

(52) U.S. Cl.
CPC ......... *H04N 19/184* (2014.11); *H04N 19/129* (2014.11); *H04N 19/182* (2014.11); *H04N 19/423* (2014.11); *H04N 19/647* (2014.11)

(58) Field of Classification Search
CPC .. H04N 19/184; H04N 19/129; H04N 19/182; H04N 19/423; H04N 19/647
See application file for complete search history.

(56) References Cited

U.S. PATENT DOCUMENTS

| | | | | |
|---|---|---|---|---|
| 5,835,391 A | * | 11/1998 | Cho | G06F 17/147 708/401 |
| 8,533,166 B1 | * | 9/2013 | Sulieman | G06F 16/183 707/693 |
| 2002/0180731 A1 | * | 12/2002 | Lapidous | G06T 15/405 345/422 |
| 2004/0190632 A1 | * | 9/2004 | Cismas | H04N 19/423 375/240.26 |
| 2010/0246687 A1 | * | 9/2010 | Yoshimatsu | H04N 19/61 375/240.25 |
| 2012/0314758 A1 | * | 12/2012 | Zhang | H04N 19/186 375/240.01 |
| 2013/0148733 A1 | * | 6/2013 | Park | H04N 19/426 375/240.16 |

* cited by examiner

*Primary Examiner* — Mohammed S Rahaman
(74) *Attorney, Agent, or Firm* — Goodwin Procter LLP (57) ABSTRACT

Methods and systems for storing pixels of a video/image frame are disclosed. According to one embodiment, a method for storing pixels of a video frame comprises allocating a region of a memory to a pixel block having pixels of the video frame selected in out-of-raster-scan-order. The allocated region corresponds to a plurality of contiguous locations in the memory, and wherein the allocated region includes a first portion for storing pixel values. Values of pixels are stored in the pixel block in the first portion.

19 Claims, 12 Drawing Sheets

FIG. 1

PRIOR ART

| Address Offset 0x0000 | 10-bit Luma Buffer 64 * 64 * 10/8 = 5120 bytes |
| Address Offset 0x1400 | 10-bit Chroma Buffer 64 * 32 * 10/8 = 2560 bytes |
| Address Offset 0x1E00 | 10-bit Luma2x Buffer 32 * 32 * 10/8 = 1280 bytes |
| Address Offset 0x2300 | Lookahead CTU Data, 112 bytes |
| Address Offset 0x2370 | Unused Space (may be used in future), 144 bytes |
| Address Offset 0x2400 | |

1100

SYSTEMS AND METHODS FOR STORING VIDEO DATA IN MEMORY

CROSS-REFERENCE TO RELATED APPLICATIONS

This application claims priority to and benefit of U.S. Provisional Patent Application No. 62/795,408, entitled "APPARATUS AND METHOD TO STORE VIDEO DATA IN DDR MEMORY," filed on Jan. 22, 2019, the entire contents of which are incorporated herein by reference.

FIELD

This disclosure relates generally to techniques for allocation of memory for data storage and, in particular, to storage of pixel blocks that are processed in video processing and/or encoding.

BACKGROUND

Video compression generally involves transforming raw frames of video data into a bitstream that is typically orders of magnitude smaller in size than the original raw stream (size measured in bits/bytes of data), and yet can adequately represent the original video. Such video compression is usually lossy and is used ubiquitously both for storage and transmission of video data.

Many modern video encoders begin by dividing each frame of raw data into a set of square processing elements, and then process these elements in a raster-scan order. The terminology for the square processing varies from encoder to encoder. For example, the term "macroblock" is used to describe a 16×16 pixel region, i.e., the square element, in encoders implementing the H.264 standard and other similar encoders. In the "High Efficiency Video Coding" (HEVC) standard, the square processing element is called a "Coding Tree Unit" (CTU), and it is a square of size 64×64 pixels. In the VP9 standard, it is called a Superblock, but has the same size of 64×64 pixels. In the discussion below, the term CTU is used for convenience. It should be understood, however, that the techniques described herein are not limited to processing elements designated as CTU or to square elements of size 64×64 pixels. The techniques described herein are applicable to any block-based processing element, regardless of its designation and/or size.

The processing of a frame by a video encoder generally involves making a prediction about a particular part of a CTU in the frame based on parts of the video that have previously been encoded and that closely approximate the actual pixels in the particular part of the CTU. Then, a difference between the actual pixels of the particular part of the CTU and the corresponding prediction is generated, and the difference (also called an error) is encoded to obtain a compressed bitstream. The encoders employ spatial and/or temporal redundancy typically present in video data. In general, the video information does not tend to change rapidly from frame to frame, or from pixel to pixel within a frame. Therefore it is usually possible to find a very good prediction for one or more parts of the current CTU based on parts of the video that have been processed previously. If the prediction is good, the difference between the actual and predicted pixels of the CTU or a part thereof (i.e., the error) can be small and, as such, the error can be represented (encoded) using much less data (in terms of bits or bytes) than that needed for encoding the actual pixel values in the CTU or a part thereof, which allows for effective compression of the video data.

Two forms of prediction are used in HEVC, VP9, and in other similar encoders. The first is called Inter Prediction, which involves looking for matching pixels in a different, previously encoded frame. The term Motion Vector describes the offset between a region to be encoded in a current frame and a corresponding region in a previously encoded frame. The second prediction method is called Intra Prediction, which involves looking for matching pixels by projecting the values of neighboring pixels of a particular region of interest to form the predicted pixel values for that region.

Video data is represented as pixels, where each pixel represents one point of an image. For example, a 1920×1080 HD image contains 1920×1080, i.e., 2,073,600 pixels. Each pixel has data associated with it to describe the color and brightness of the pixel. One common representation of a pixel is YUV where Y represents a luminance (luma), or brightness, component and U and V represent chroma or color data. Another format for pixels is RGB, where three separate color components, red, green, and blue, together define the color and brightness of the pixel. YUV can be converted to RGB and vice versa through linear transformations.

SUMMARY

Methods and systems for storing pixels of a video/image frame are disclosed. According to one embodiment, a method for storing pixels of a video frame comprises allocating a region of a memory to a pixel block having pixels of the video frame selected in out-of-raster-scan-order. The allocated region corresponds to a plurality of contiguous locations in the memory, and wherein the allocated region includes a first portion for storing pixel values. Values of pixels are stored in the pixel block in the first portion.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The present embodiments will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the present embodiments. In the drawings.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

The following disclosure provides different embodiments, or examples, for implementing different features of the subject matter. Specific examples of components and arrangements are described below to simplify the present disclosure. These are, of course, merely examples and are not intended to be limiting.

Methods and systems for storing pixels of a video/image frame are disclosed. According to one embodiment, a method for storing pixels of a video frame comprises allocating a region of a memory to a pixel block having pixels of the video frame selected in out-of-raster-scan-order. The allocated region corresponds to a plurality of contiguous locations in the memory, and wherein the allocated region includes a first portion for storing pixel values. Values of pixels are stored in the pixel block in the first portion.

In the discussion below, the YUV format is used for the sake of convenience. The storage techniques described herein are not limited to the YUV format however, and may be applied to the RGB or any other pixel formats. When the YUV format is used, for each of the three components, Y, U and V, a certain number of bits can be used to adjust the precision of the representation. Commonly used values are 8 bits and 10 bits, but the storage techniques described herein are applicable to representation of the pixel components using other bit sizes, as well.

When video data is stored in the YUV format, often chroma data is represented at less resolution than luma data, because the human eye is less sensitive to chroma resolution than luma. One format for storing video data is called 4:2:0. In this format, for every 2×2 pixel square of luma (Y) data there is only a single pair of chroma (U,V) data. Thus, the U data and V data each is only ¼ the total amount of Y data in an image or CTU. The total amount of aggregate U and V data in a frame is only ½ the amount of the Y data in a frame.

Figure 1:
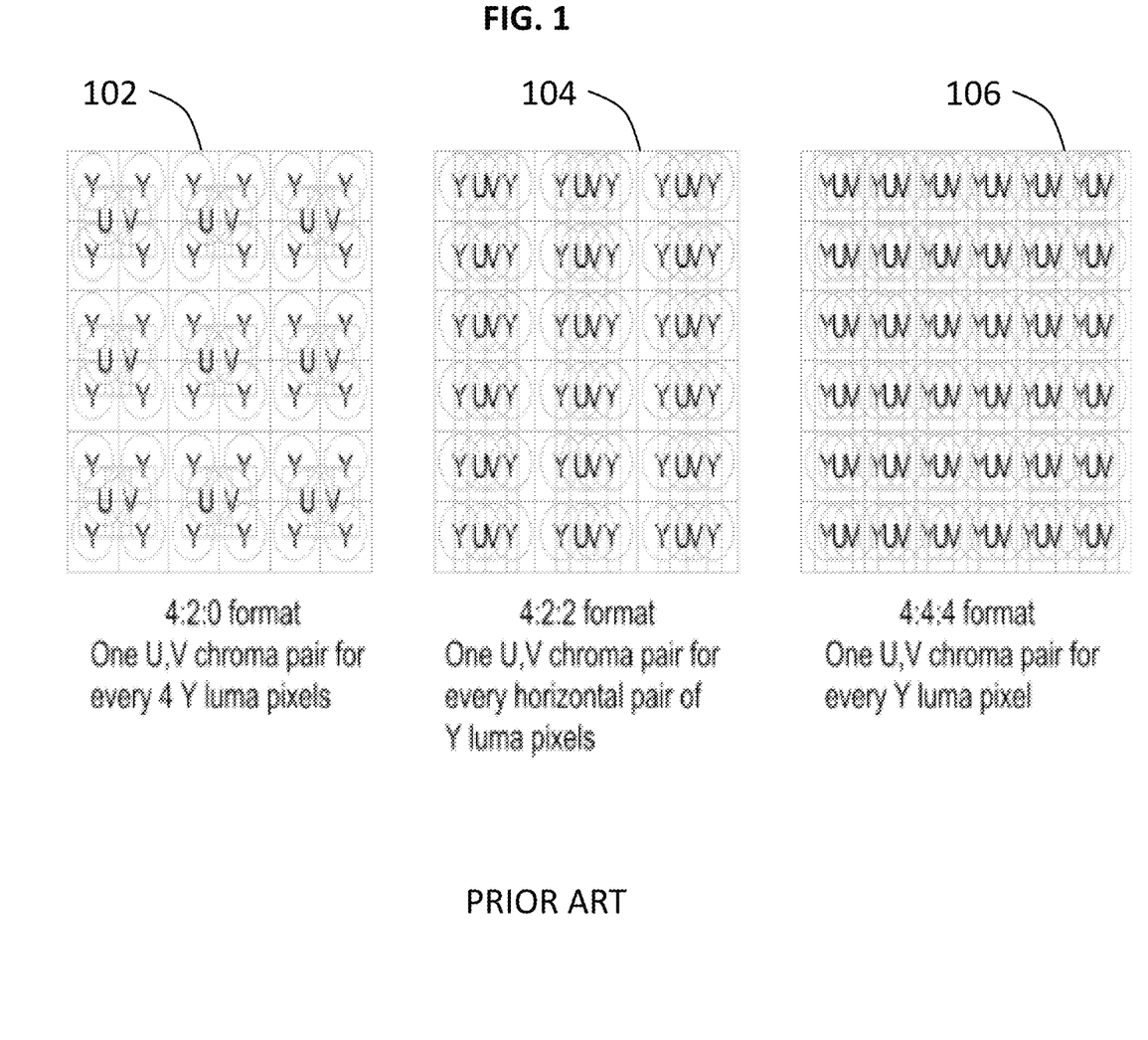
FIG. 1 schematically depicts several prior art YUV formats for storing image data.

Various embodiments described here assume the use of the 4:2:0 format for the sake of convenience. The storage techniques described herein are applicable, however, to other YUV formats (e.g., 4:2:2, 4:4:4, etc.), as well. The 4:2:0, 4:2:2, and 4:4:4 formats are illustrated in FIG. 1, which schematically depicts several prior art YUV formats for storing image data. As can be seen in block 102, the 4:2:0 format has one U,V pair representing color information per a square of four Y (luma) pixel values. The 4:2:2 format, shown in block 104, increases the amount of chroma information, such that there is one U,V pair for every two horizontal Y (luma) pixel values. As shown in block 106, the 4:4:4 format stores a Y,U,V value for every single pixel. It should be understood that in various storage techniques described below, which assume the use of the 4:2:0 format, the storage space allocated for chroma data may be increased according to the factors described above, to accommodate the additional chroma data of the 4:2:2, 4:4:4, and other formats.

As described above, video data is processed by an encoder or decoder in square blocks of pixels. The raw video data is generally stored in a storage medium such as Dual-edge Dynamic Random Access Memory, or DDRAM, or just DDR for short (also known as double data rate memory), in the raster scan order. Thus, 1920×1080 frame of raw data is stored as 1080 rows, where each row includes 1920 pixels, and the pixels are stored sequentially as they are detected in the raster scan order. Reading the memory where the video data is stored in the sequential order will then return the first row of pixels of the frame first, followed by the second row of pixels, etc.

A CTU, however, includes out-of-raster-scan-order pixels. For example, the first CTU block of a frame includes not all but only the first 64 pixels of the first row of the frame. It then skips the remaining raster-scan-order pixels in the first row, and includes the first 64 pixels of the second row. If the starting index for both the rows and columns of a frame is "0," the second CTU includes pixels [64:127] in rows [0:63]; all other pixels in the first 64 rows are not included in the second CTU. To read all the data for the first CTU from the memory, many conventional systems require reading pixels from each of the first 64 rows. In each row read, not all the pixels from that row are needed, however. Rather, from each row only 64 pixels from the total of 1920 pixels in that row are needed. While reading pixels of the first CTU block is described here, it should be understood that to read any CTU, 64 rows must be read and, from each row not all but only a particular slice of 64 pixels is needed.

This partial reading of several rows makes memory read operation inefficient in general and particularly when the memory is DDR memory. In case of large memory units, such as those that can hold pixel data for one or more video frames, it is beneficial to read (or write) a large number of contiguous memory locations in each read (or write) operation, so that the read/write operations are performed at the high speed for which the memory is rated. While it may not be necessary to read (or write) the entire row (or column), it is generally necessary to read (or write) a significant portion of the row (or column) that is accessed such that one page of data is read (written) in each access. The size of the page is often a defined characteristic of the memory.

In using DDRAMs for example, to access data efficiently, so that performance of the read/write operations does not degrade substantially, certain rules/guidelines must be followed in accessing locations of the memory. A typical set of rules/guidelines includes:
1. Reading a long sequence of contiguous bytes in one burst is much more efficient than reading one or few bytes at a time.
2. Accessing successive memory locations that are within a restricted range that map to locations within one page of the DDR is much more efficient than accessing memory locations from outside of the page, even when long bursts are used.
3. The minimum DDR page size is 4 KBytes in a 32-bit DDR memory system; a 64-bit DDR memory system typically has a page size of 8 KByte.

The conventional raster-scan order storage of pixel values is generally not compatible with the requirements described above for DDR and other types of memories, which can lead to increased delays in read/write operations and performance degradation.

Various embodiments described herein allow for efficient access to the memory (e.g., DDR memory), which is achieved, in part, by storing in memory the respective pixel values corresponding to each CTU in respective contiguous regions of the memory, so that those pixels can be accessed using fewer read/write operations than those that would be needed in a conventional, raster-scan-order-based storage of pixels. Each contiguous block of memory may also fit within a page of the memory. The different CTUs may be stored in the raster-scan order, even though the pixels values in the CTUs are not. The memory allocation for each CTU may also include additional space (memory locations) for storing auxiliary data generated while processing (e.g., encoding or decoding) the CTUs. The additional space may be allocated contiguously with the space allocated for storing the pixel values. As such, all of the data associated with a CTU can be accessed efficiently.

Various embodiments of storage systems and methods described herein allow sequential access to a required block (generally referred to as a CTU), e.g., a 64×64 block of pixels, a 32×32 block of pixels, etc., optionally with the associated auxiliary data. The sequential access can result in efficient memory access and a reduction in data read/write delays. Various embodiments described herein can be beneficially used to access frame blocks by video encoders and decoders. These storage techniques are not limited to video encoding/decoding, and can be used beneficially in other video/image processing applications, as well. These applications and the video encoders/decoders may be implemented in hardware, e.g., as an Application Specific Integrated Circuit (ASIC) or a Field Programmable Gate Array (FPGA), in software, or using a combination of both hardware and software.

Figure 2:
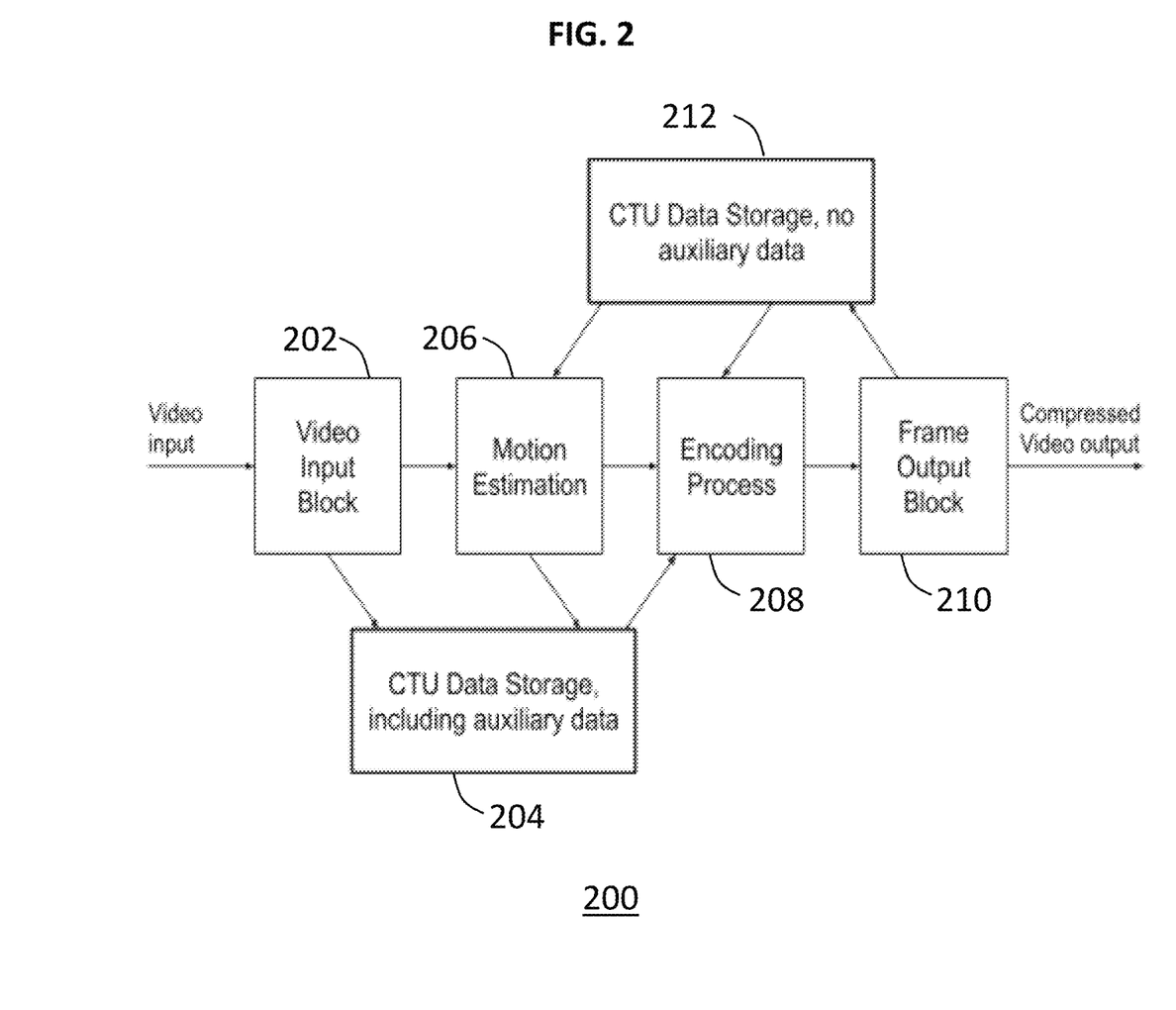
FIG. 2 is a block diagram of a video encoding system using a specialized storage architecture for storing video frame blocks, according to one embodiment.

FIG. 2 is a schematic block diagram of a video encoding system using a specialized storage architecture for storing video frame blocks, according to one embodiment. With reference to FIG. 2, a video encoder 200 includes an input module 202 (video input block/module) that receives the raw video data to be processed, where the raw data includes pixel values in the raster scan order. The input module 202 stores in memory 204 the received data on a CTU-by-CTU basis, where the memory 204 includes a designated region for each CTU, and where each region is allocated according to various embodiments described below. The region allocated for each CTU may optionally include space for auxiliary data. For example, motion estimation module 206 may perform motion estimation as part of the inter-frame prediction for a CTU, and may store motion vector data in the auxiliary field of the storage region allocated to that CTU.

The CTU data, including the pixel values and the motion vectors, may then be processed by the encoding process module 208. The frame output module 210 may transmit an encoded bitstream for an entire frame that includes several CTUs and, optionally, may perform local decoding of the frames and/or the encoded CTUs, so as to extract information that can be used to fine-tune the processing of subsequent CTUs and/or frames. To this end, the frame output module 210 may store CTU data in memory 212, which also includes a designated region for each CTU, and where each region is allocated according to various embodiments described below. Such CTU data may be used by the motion estimation module 206 and the encoding process module 208 during processing of subsequent CTUs and/or frames.

In some embodiments, each of the modules 202, 206, 208, 210 processes data associated with 64×64 pixel CTUs. Data for the CTU currently under processing may be stored in and read from the memory 204 and data for the previously processed CTUs may be accessed from the memory 212. The frame output module 210 may store data for the currently processed CTU in the memory 212.

Figure 3:
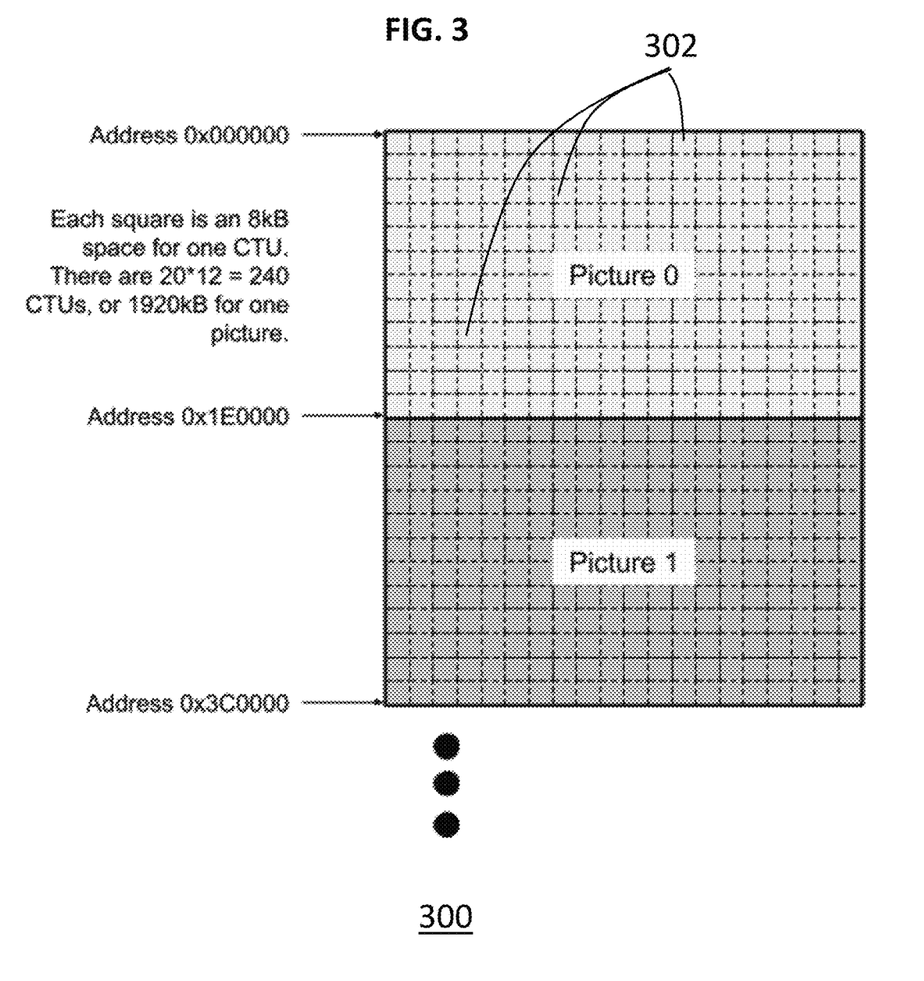
FIG. 3 schematically depicts a memory map for two video frames stored according to one embodiment.

FIG. 3 schematically depicts a memory map for two video frames stored according to one embodiment. Specifically, FIG. 3 illustrates an exemplary memory layout 300 for two 1280×720 pixel frames, according to one embodiment. The first 1280×720 pixel frame (Picture 0) is shown as divided into 64×64 pixel squares, e.g., CTUs, and data for each of the CTUs of the frame is stored in a respective allocated region 302. As 720 is not evenly divisible by 64, the bottom row of the CTUs will not be utilized completely. It should be noted that the frame size of 1280×720 pixels is illustrative only, and other frame sizes, such as those according to various image/video processing standards, are contemplated. FIG. 3 shows that each frame is stored in the memory such that each CTU of the frame is stored in one contiguous 8 Kbyte region of the memory. A sequence of CTUs in raster scan order may occupy successive blocks of 8 Kbytes of memory.

For Picture 0, in each CTU row, there are 1280/64, i.e., 20 CTU regions, and there are a total of 720/64, i.e., 12 CTU rows, resulting in a total of 240 CTUs. If the starting address of the first CTU region is 0x000000 and if all CTU regions are contiguous, the last CTU region would end at the address 0x1DFFFF, and the first CTU region of the next frame, Picture 1, may start at the address 0x1E0000. The next frame (e.g., Picture 2) may start at the address 0x3C0000.

Figure 4A:
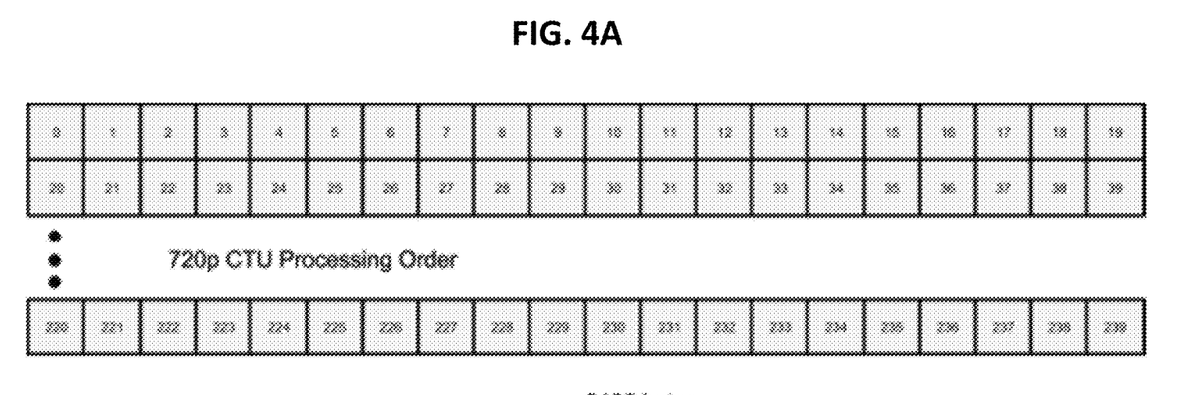
FIGS. 4A and 4B depict an order of accessing the blocks of a frame and a map of a memory region allocated to a CTU, according to one embodiment.
Figure 4B:
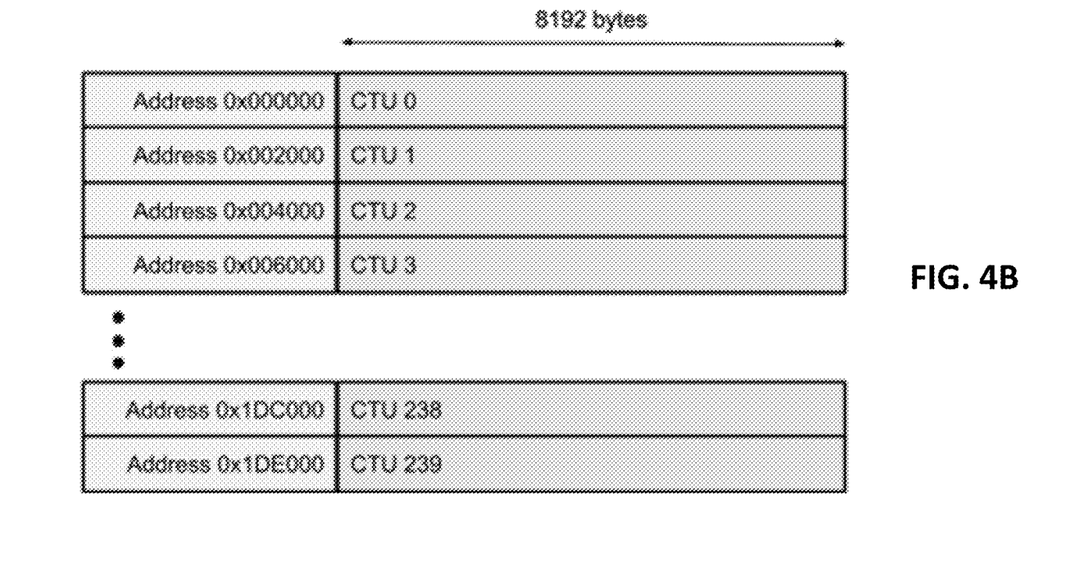

FIGS. 4A and 4B depict an order of accessing the blocks of a frame and a map of a memory region allocated to a CTU, according to one embodiment. In particular, FIGS. 4A and 4B illustrate an exemplary CTU buffer layout for a 1280×720 pixel frame (also referred to as a 720p frame), which contains 240 CTUs, according to one embodiment. In particular, FIG. 4A shows the numbering of the 240 CTUs according to one embodiment, where the CTUs are numbered in the raster scan order, i.e., CTUs are numbered in rows proceeding from top of the frame to bottom of the frame.

FIG. 4B shows the layout of the CTUs as a contiguous memory map according to one embodiment. FIG. 4B shows the starting address of the region allocated to each CTU. In this embodiment, the entire frame occupies a contiguous block of memory, with each CTU occupying a respective smaller contiguous block of memory within the larger space.

In this embodiment, the size of the memory region allocated to each CTU is 8 Kbytes, e.g., the same size as a page of the memory. It should be understood that the starting address of the first CTU region can be different from 0x000000, and that the entire frame may occupy two or more discontiguous regions of memory, with each CTU occupying a respective smaller contiguous block of memory within the larger discontiguous space.

Figure 5:
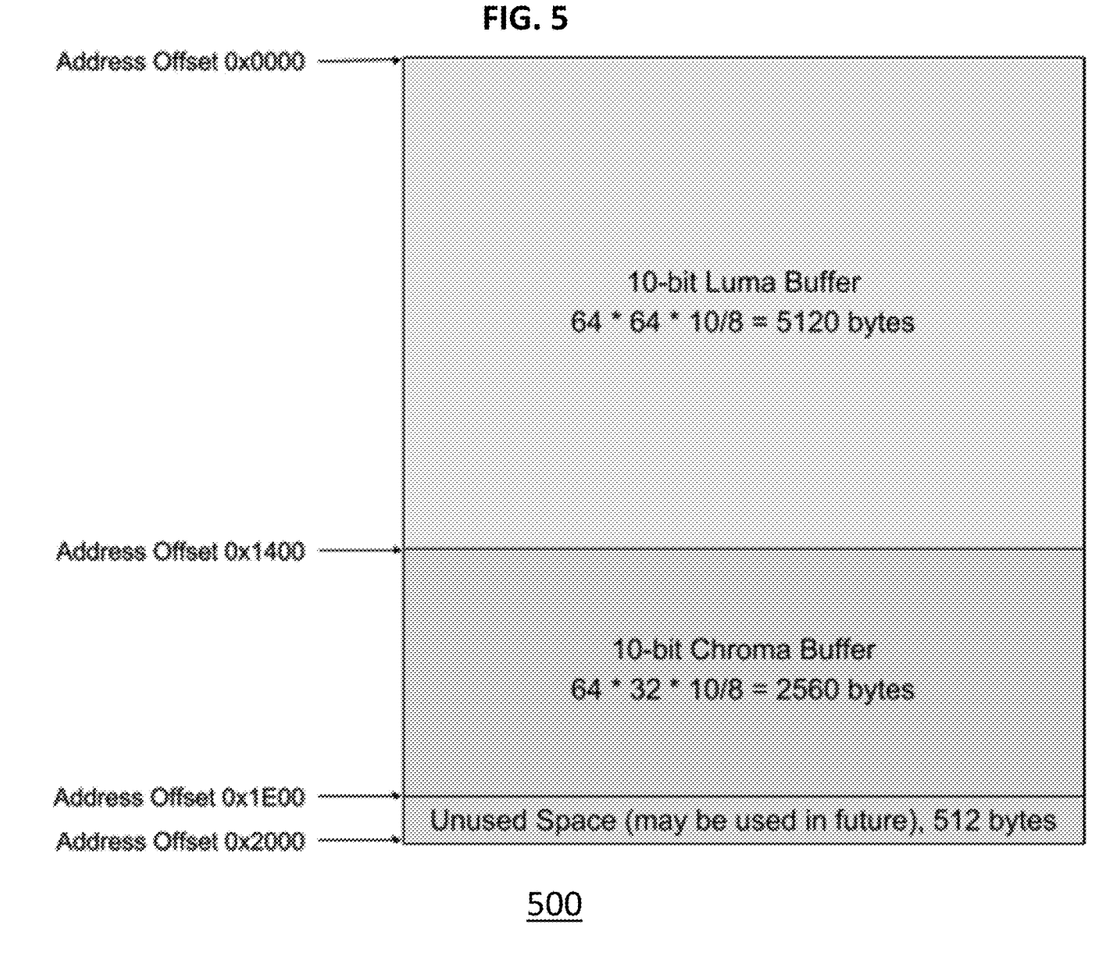
FIG. 5 schematically depicts a memory region allocated to a CTU, according to one embodiment.

FIG. 5 schematically depicts a memory region allocated to a CTU, according to one embodiment. With reference to FIG. 5, the format of CTU data within an 8 Kbyte memory region 500 allocated to a CTU (also referred to as CTU region) is illustrated, according to one embodiment. Within a CTU region, the pixel data is stored in a semi-planar format, such that there are separate areas for luma and chroma data, Luma Buffer and Chroma Buffer, respectively. The memory format is compatible with both 8-bit and 10-bit pixel data, and each CTU region uses the same amount of memory regardless of the pixel bitwidth. Of the 8 Kb used for storing each CTU, the luma data consumes the first 5 Kb, corresponding to contiguous address offset range 0x0000 through 0x13FF. The address offsets are simply added to the actual starting address, which may or may not be 0x00000. The chroma data consumes the next 2.5 Kb, corresponding to contiguous address offset range 0x1400 through 0x1DFF. The remaining 512 bytes are unused and are reserved for future use, e.g., to store any auxiliary data. The CTU region ends at the address offset 0x1FFF and the next CTU region may start at the address offset 0x2000.

When the 4:2:0 YUV format is used, the size of U and V data each, is only ¼ the size of the Y data and, collectively, the UV data is half in size of the Y data. Y data is stored for each pixel in the 64×64 block and, as such, there are 64×64 8 or 10 bits values in the Luma Buffer. In contrast, chroma values are stored once for a block of 4×4 pixels and, as such, there are 32×32 U values and 32×32 V values, or 64×32 U and V values, which can be 8 or 10 bit values. Each of the 32 rows in the Chroma Buffer stores 32 U values and 32 V values, in one embodiment.

In this embodiment, the chroma offset into the CTU storage always corresponds to 5 Kb, regardless of whether 8-bit or 10-bit video is stored. In general, it may be useful to store the auxiliary data along with the pixel data for each CTU. There are 512 unused bytes in each CTU region, and while such padding may be inserted to make each CTU region an even 8 Kbytes in size (which can also make the calculation of memory addresses efficient), the unused space may be used to store other data, such as the auxiliary data. If more than 512 bytes are required to store the auxiliary data, the size of the CTU region can be enlarged.

Figure 6:
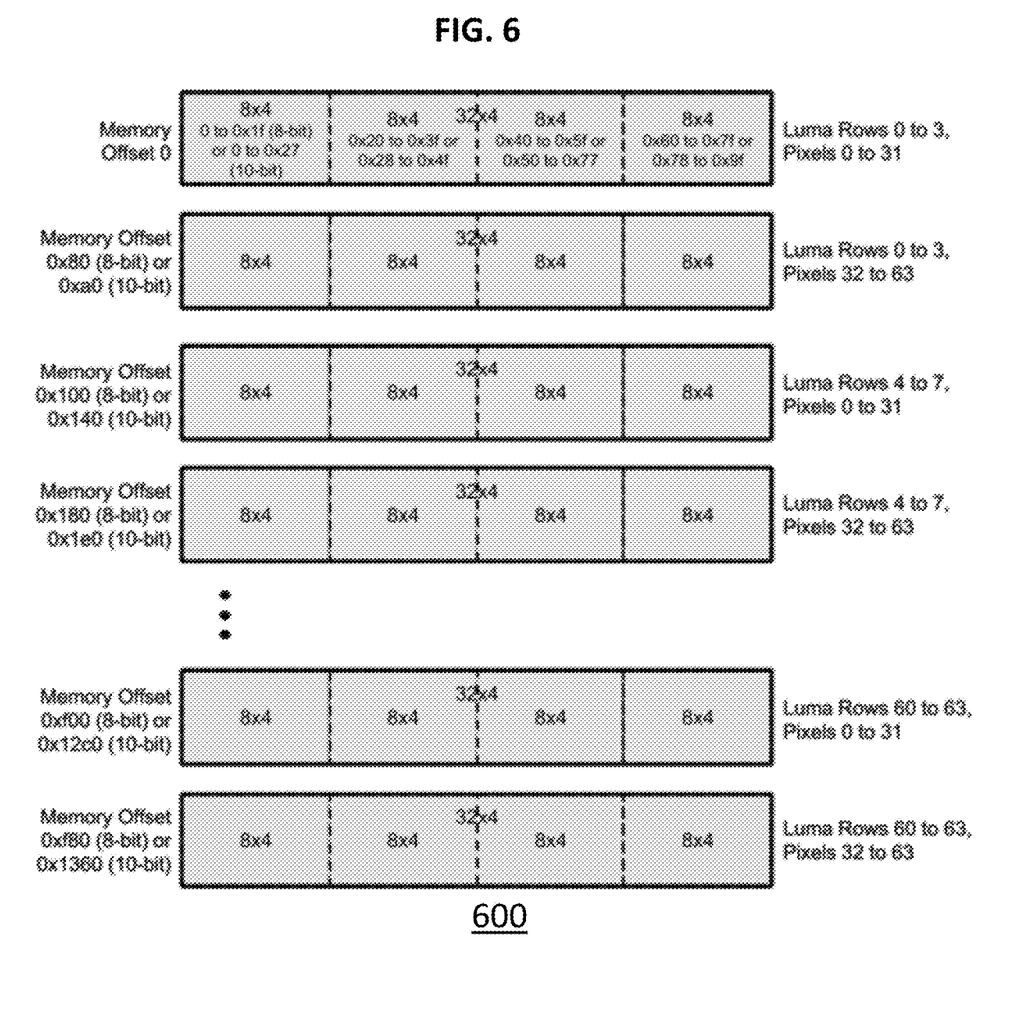
FIG. 6 schematically depicts a configuration of a luma buffer in the allocated memory region of FIG. 5.
Figure 7:
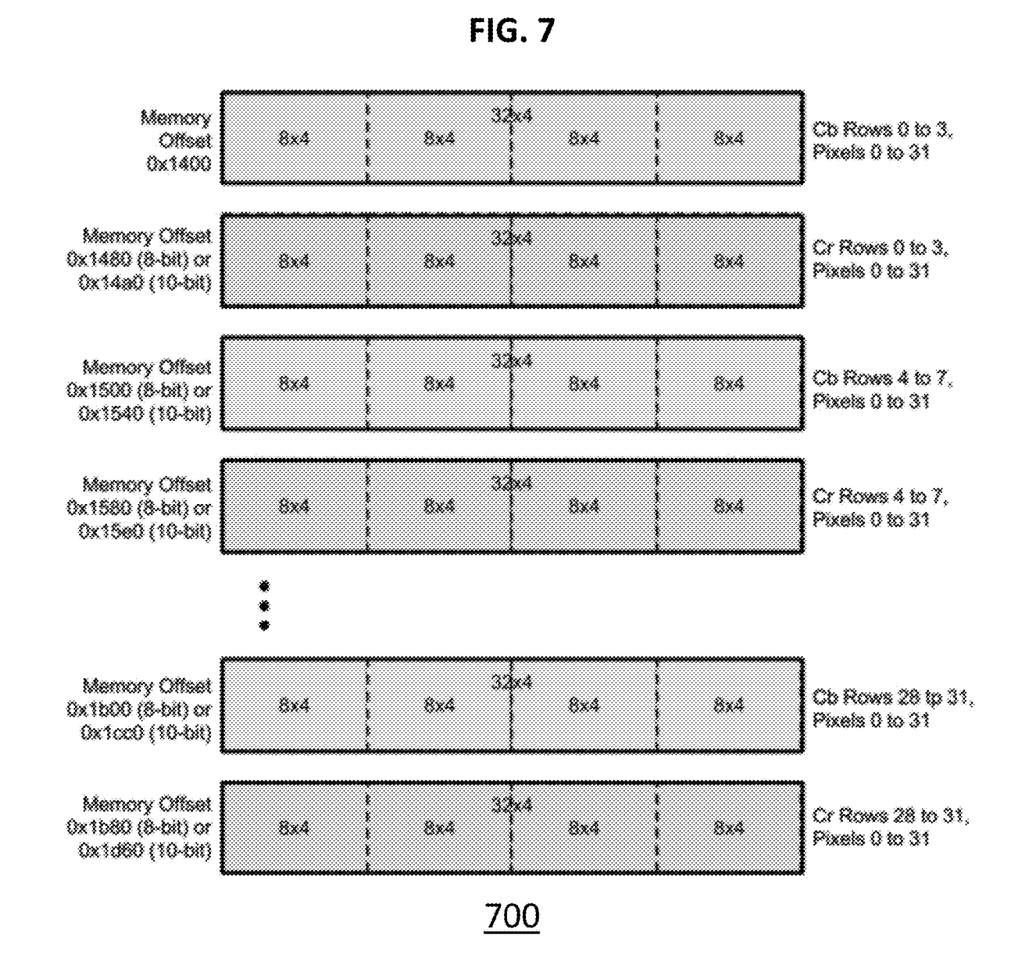
FIG. 7 schematically depicts a configuration of a chroma buffer in the allocated memory region of FIG. 5.

FIG. 6 schematically depicts a configuration of a luma buffer in the allocated memory region of FIG. 5 and FIG. 7 schematically depicts a configuration of a chroma buffer in the allocated memory region of FIG. 5. Thus, with reference to FIGS. 6 and 7, the storage of data within the luma and chroma planes of the CTU region 500 of FIG. 5 is described, according to one embodiment. The pixels are stored in 8×4 blocks. Each 8×4 block may occupy either 32 bytes or 40 bytes, depending on whether the pixel size is 8 bits or 10 bits.

With reference to FIG. 6, in the layout 600 of the luma pixels according to one embodiment, a slice of four rows and 64 columns of the Luma Buffer in FIG. 5 is split into two subregions, each subregion having four rows and 32 columns. The first subregion stores the Y values for the first 32 pixels in the corresponding rows, and the second subregion stores the Y values for the remaining 32 pixels in the corresponding rows. The 32 columns are further partitioned into units of 8 columns. The rows range from Row 0 through Row 63.

FIG. 7 depicts the layout 700 of the chroma pixels in the Chroma Buffer of FIG. 5, according to one embodiment. As the Chroma Buffer of FIG. 5 stores only half the number of values as the number of values stored in the Luma Buffer, the rows in the Chroma Buffer range from 0 through 31. Here again, each slice of four rows and 64 columns of the Chroma Buffer in FIG. 5 is split into two subregions, each subregion having four rows and 32 columns. The first subregion stores the 32 U values for all 64 pixels in the corresponding rows, and the second subregion stores the 32 V values for all 64 pixels in the corresponding rows. While one embodiment uses 8×4 as the fundamental block or unit size for pixel storage, other sizes such as 8×8, 16×4, 8×2, etc., may be used in different embodiments.

When 8 bit pixels are used, an 8×4 array of pixel values occupies 32 bytes. When 10 bit pixels are used, an 8×4 array of pixel values occupies 40 bytes. Both options are shown in FIGS. 6 and 7, where the address offsets for different subregions change based on whether 8 or 10 bits are used to represent the pixel values. Other pixel sizes, such as 6, 12, 18 bits per pixel, etc., are contemplated by this format. For example, an 8×4 array of pixel values with 12 bits per pixel would occupy 48 bytes.

There are many benefits in accessing memory (e.g., DDR memory) using the storage formats described above. When 10-bit video is used, in one embodiment, the luma data is written in chunks of 32×4 pixels that are further decomposed into units of 8×4 8-bit LSBs of each pixel, followed by 8×4 2-bit MSBs, resulting in 40 bytes total for an 8×4 luma component, and a total size of 160 bytes per chunk. Two chunks can read/written from/to the memory at the same time when DDR memory is used, resulting a total memory burst size of 320 bytes. The chroma data is written in chunks of 32×4 that are further decomposed into sections of 8×4 8-bit LSBs, followed by 8×4 2-bit MSBs. First a Cb chunk of 32×4 may be stored/read, followed by a Cr chunk, which translates into a total burst size of 320 bytes for two chroma chunks. Chunks are stored contiguously. If 8 bit video is used, the same grouping can be used, but instead of 320 bytes per memory burst, 256 bytes are stored or read. These large-size bursts can improve the efficiency of accessing DDR memory and any large memory, in general. Also, accessing the data in 8×4 arrays returns data in the order in which the encoder or decoder generally processes the contents of the CTU.

Figure 8:
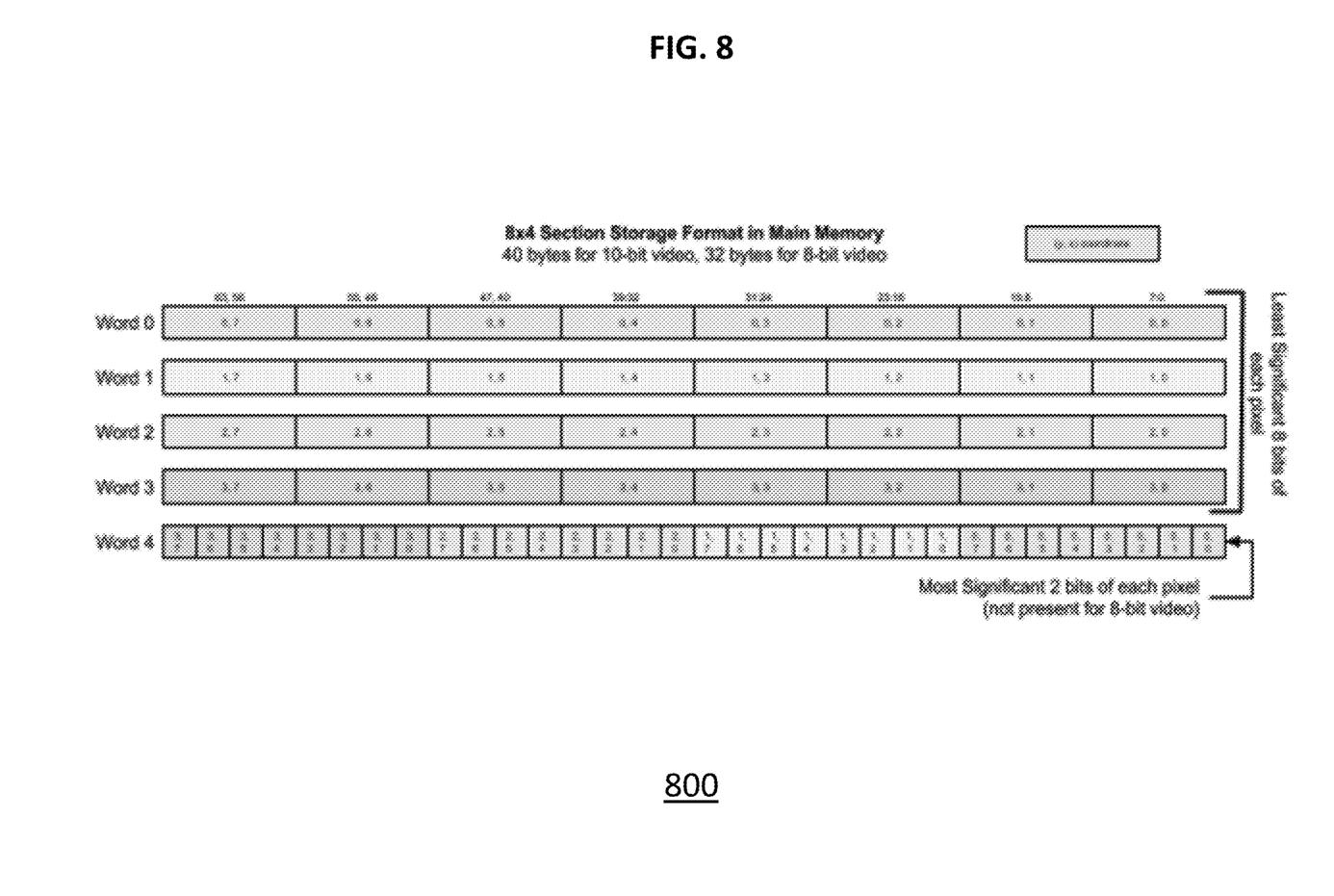
FIG. 8 schematically depicts a configuration of a memory unit in the allocated memory region of FIG. 5.

FIG. 8 schematically depicts a configuration of a memory unit in the allocated memory region of FIG. 5. In particular, FIG. 8 depicts an exemplary storage format 800 in the memory for an 8×4 unit, according to one embodiment. The location of pixel data within each byte is shown in FIG. 8. Note that to provide a common storage format for both 8 and 10 bit data, 40 bytes are reserved for storage regardless of whether the pixel format is 8 or 10 bits. In the case where only 8 bits are used, 8 bytes of each 40 byte allocation are not used. In this case, the 32 bytes that are used are packed together in this embodiment, so that the unused space is contiguous.

Figure 9:
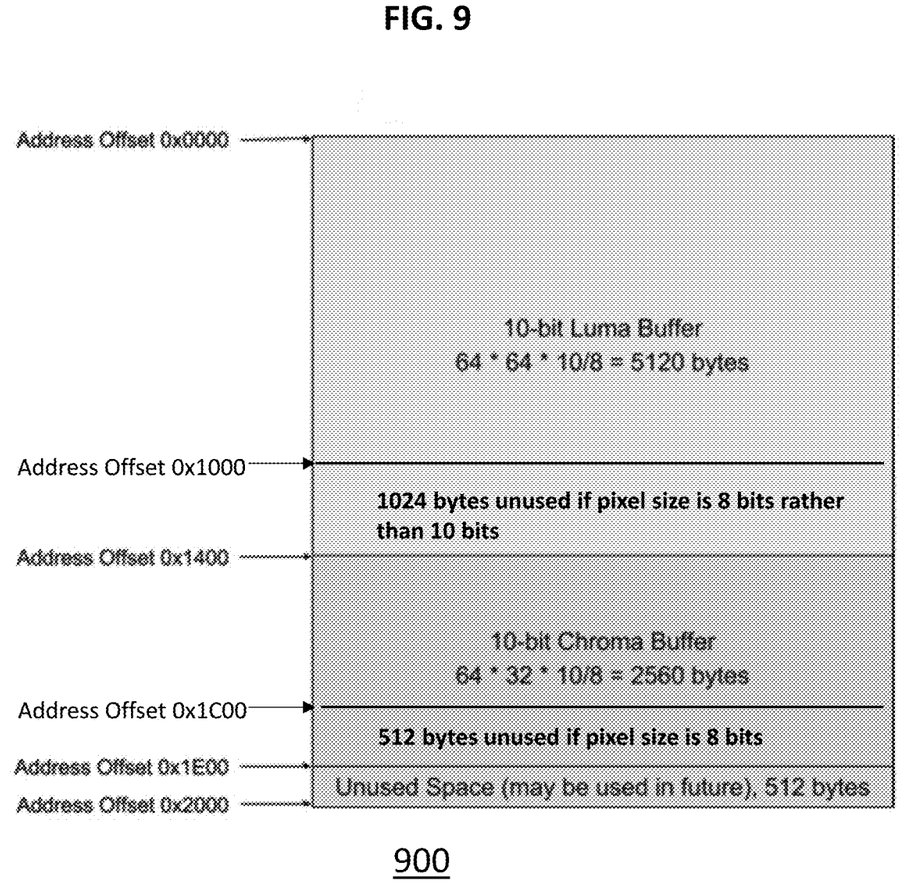
FIG. 9 schematically depicts the memory region of FIG. 5 configured corresponding to two different pixel resolutions, according to some embodiments.

FIG. 9 schematically depicts the memory region of FIG. 5 configured corresponding to two different pixel resolutions, according to some embodiments. With reference to FIG. 9, the format of CTU data within an 8 Kbyte memory region 900 (which is similar to the memory region 500 shown in FIG. 5) is shown. FIG. 9 shows how the memory region is occupied depending on whether 8 bit pixels or 10 bit pixels are used to represent the pixel values. For Luma, 5120 bytes are allocated. If the pixel size is 10 bits, all 5120 bytes are used. If the pixel size is 8 bits, only 4096 bytes are used, with 1024 bytes left unused at the end of the Luma Buffer. For chroma, 2560 bytes are allocated. If the pixel size is 10 bits, all 2560 bytes are used. If the pixel size is 8 bits, only 2048 bytes are used, with 512 bytes left unused at the end of the Chroma Buffer.

Figure 10:
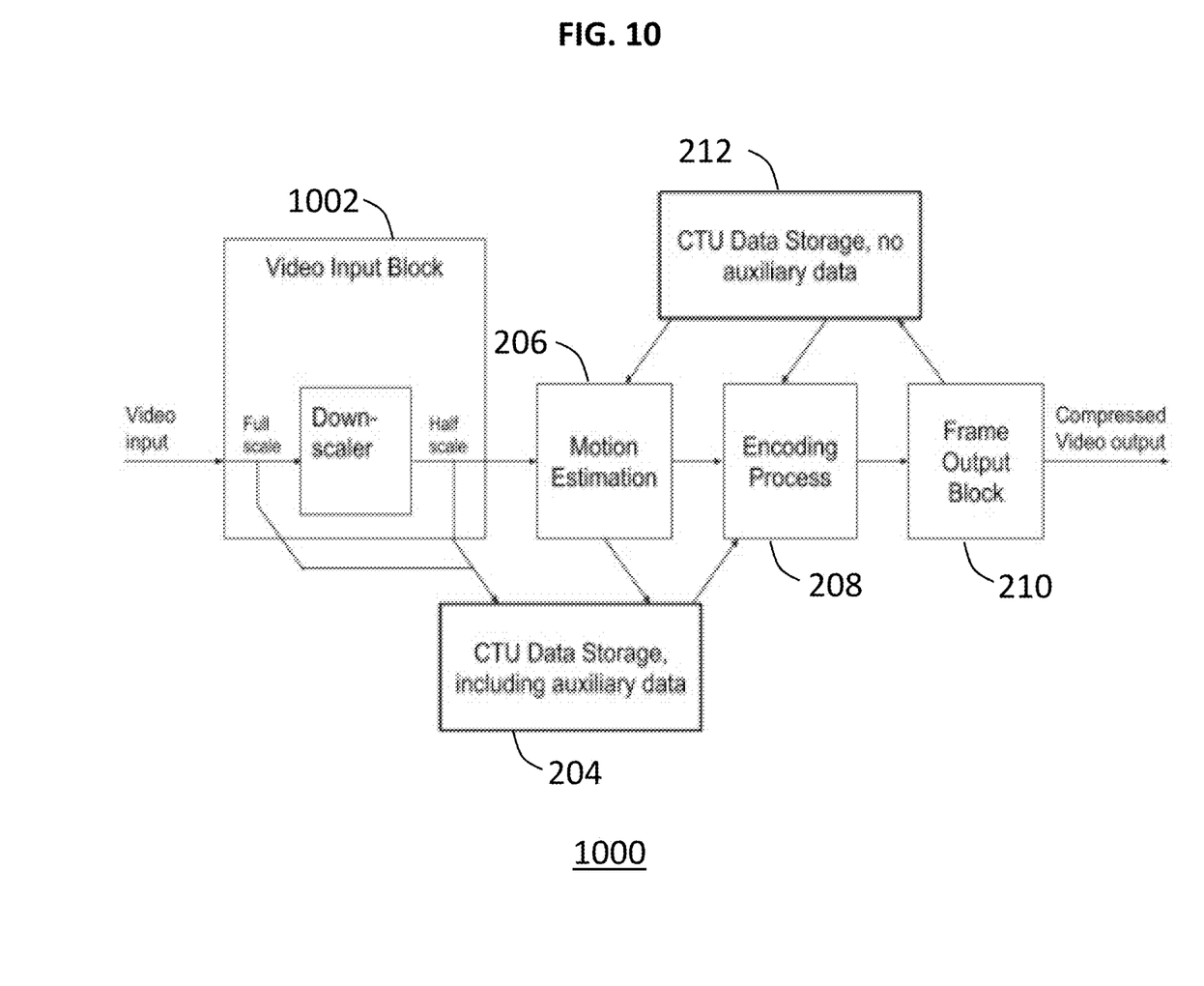
FIG. 10 is a schematic block diagram of a modified video encoding system of FIG. 2, using an enlarged storage architecture for storing video frame blocks, according to one embodiment.

FIG. 10 is a schematic block diagram of a modified video encoding system of FIG. 2, using an enlarged storage architecture for storing video frame blocks, according to one embodiment. With reference to FIG. 10, in an exemplary encoder system 1000 (which is similar to the encoder 200 in FIG. 2), the input module 1002 (video input block/module) additionally includes a downscaler that produces a ½ scale representation of each input frame for further processing thereof, for example in Motion Estimation, according to one embodiment. In this case, two sets of luma values are stored. In the first set, a luma value is provided for each one of the 64×64 pixels of the CTU, as described above. In the second set, one luma value is provided for an array of 2×2 pixels, so that a total of 32×32 reduced resolution luma values are provided. These values may be used in other steps of the overall encoding process where the processing of those steps can be accelerated as fewer luma values are analyzed. In addition, motion vectors are stored in the CTU structure, so that additional CTU storage space is needed.

Figure 11:
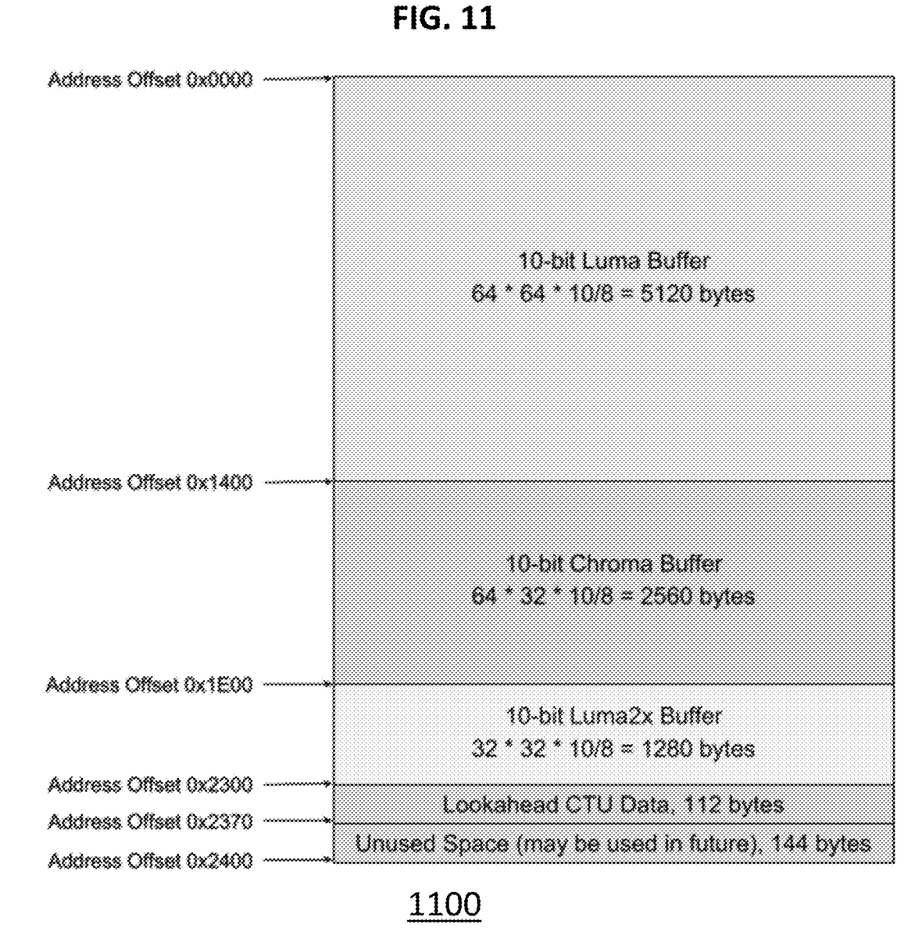
FIG. 11 schematically depicts the memory region of FIG. 5, enlarged according to one embodiment.

FIG. 11 schematically depicts the memory region of FIG. 5, enlarged according to one embodiment. With reference to FIG. 11, an exemplary CTU memory layout 1100, i.e., the memory region allocated to a CTU, has a size of 9 Kbytes, leaving 1.5 Kbytes for storing auxiliary data, according to one embodiment. In this example, 1280 additional bytes are used to store a reduced resolution version of the luma component of the CTU. In addition, 112 bytes are used to store motion vector information. By adjusting the size of the region allocated in memory to a CTU, space for storing additional auxiliary data can be added as needed.

Figure 12:
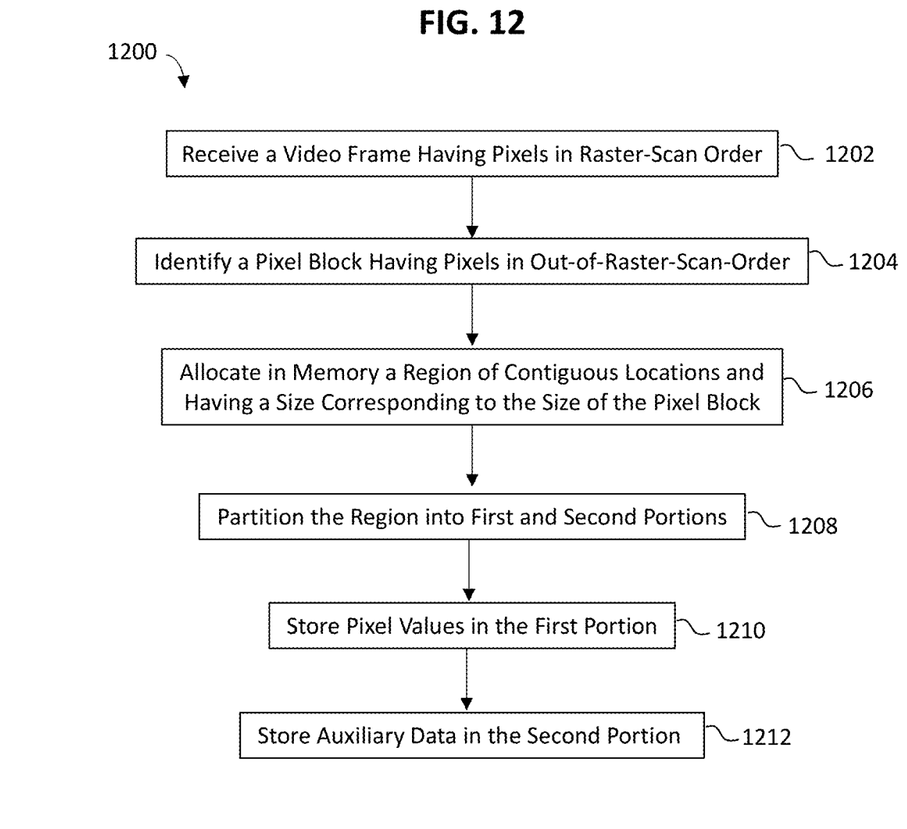
FIG. 12 is a flow chart illustrating a process for allocating memory and storing pixels values in the allocated memory, according to one embodiment.

FIG. 12 is a flow chart illustrating a process for allocating memory and storing pixels values in the allocated memory, according to one embodiment. In the process 1200 shown in FIG. 12, a video frame is received at step 1202, where the pixels in the video frame are arranged in the raster-scan order. At step 1204, a block of pixels is identified, where the identified or selected pixels that form the block are not in the raster-scan order. Specifically, the pixels in the block may belong to one or more rows and one or more columns of the frame, and certain other pixels from one or more of those rows and/or columns may not be included in the identified block. A memory region is allocated in step 1206 for the storage of the block. The memory region has a size corresponding to the size of the pixel block. For example, the size of the memory region is at least equal to the size of the pixel block, and may be larger than the size of the pixel block, e.g., 5% larger, 10% larger, etc. The allocated memory region includes locations from the memory that are contiguous.

In step 1208, the allocated memory region is partitioned into two portions, where the first portion is designated to store the pixel values and the second portion may be used for storing auxiliary data generated during processing of the block and/or the frame containing the block. The pixel values in a selected format, e.g., YUV, RGB, etc., are stored in the first portion, in step 1210. During processing of the block/frame, processed pixel values may be stored in the first portion and raw and/or processed pixel values may be accessed (read) from the first portion. The auxiliary data generated during processing of the block/frame may be stored and/or accessed in the optional step 1212.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated.

What is claimed is:

1. A method for storing pixels of a video frame, the method comprising:
   allocating a region of a memory to a pixel block having pixels of the frame selected in out-of-raster-scan-order, wherein the allocated region corresponds to a plurality of contiguous locations in the memory, and wherein the allocated region includes a first portion for storing pixel values; and
   storing values of pixels in the pixel block in the first portion,
   wherein the first portion has a set of sections, a subset of the set of sections having a size corresponding to a data size of a single read or write operation of the memory or a page of the memory, wherein each section corresponds to pixels from four rows and eight columns of the pixel block, and the subset comprises four sections.

2. The method of claim 1, wherein the allocated region includes a second portion for storing auxiliary data.

3. The method of claim 1, wherein the pixel block has pixels selected from 64 contiguous rows of the frame and 64 contiguous columns of the frame.

4. The method of claim 1, wherein storing the values of pixels comprises storing luma values of the pixels in a luma buffer in the first portion and storing chroma values of the pixels in a chroma buffer in the first portion.

5. The method of claim 4, wherein a size of the luma buffer is two times a size of the chroma buffer.

6. The method of claim 1, wherein storing the values of pixels comprises storing least significant bits of the values in a first subsection of a first section in the set of sections, and storing most significant bits of the values in a second subsection of the first section.

7. The method of claim 1, wherein storing the values of pixels comprises storing all bits of the values in a first subsection of a first section in the set of sections.

8. The method of claim 1, further comprising:
   generating the pixel block from raw video;
   performing one or more pre-encoding operations on the pixel block, the one or more pre-encoding operations including reading the values of pixels in the pixel block from the first portion; and storing auxiliary data generated by the one or more pre-encoding operations in a second portion; and
   encoding the pixel block by reading the values of pixels in the pixel block from the first portion and reading the auxiliary data from the second portion.

9. The method of claim 1, further comprising:
repeating the allocating and storing steps with respect to another pixel block having different pixels of the frame selected in the out-of-raster-scan-order, wherein the allocated regions are contiguous with respect to each other.

10. The method of claim 1, wherein the memory is a DDR memory.

11. A storage module comprising:
a first region of memory allocated to a first pixel block having video frame pixels selected in out-of-raster-scan-order, wherein the first allocated region:
corresponds to a plurality of contiguous locations in the memory; and
includes a first portion for storing pixel values,
wherein the first portion has a set of sections, a subset of the set of sections having a size corresponding to a data size of a single read or write operation of the memory or a page of the memory, wherein each section corresponds to pixels from four rows and eight columns of the pixel block, and the subset comprises four sections.

12. The storage module of claim 11, wherein the first allocated region includes a second portion for storing auxiliary data.

13. The storage module of claim 11, wherein the first pixel block has pixels selected from 64 contiguous rows of the frame and 64 contiguous columns of the frame.

14. The storage module of claim 11, wherein the first portion comprises:
a luma buffer for storing luma values of the pixels; and
a chroma buffer for storing chroma values of the pixels.

15. The storage module of claim 14, wherein a size of the luma buffer is two times a size of the chroma buffer.

16. The storage module of claim 11, wherein a first section in the set of sections comprises:
a first subsection for storing least significant bits of the pixel values; and
a second subsection for storing most significant bits of the pixel values.

17. The storage module of claim 11, wherein a first section in the set of sections comprises:
a first subsection for storing all bits of the pixel values.

18. The storage module of claim 11, further comprising:
a second region of the memory allocated to a second pixel block having video frame pixels that are: (i) different from the video frame pixels of the first pixel block, and (ii) selected in the out-of-raster-scan-order, wherein the allocated first region and the allocated second region are contiguous in the memory.

19. The storage module of claim 11, wherein the memory is a DDR memory.

\* \* \* \* \*